US011992971B2

(12) United States Patent
Piccoli

(10) Patent No.: US 11,992,971 B2
(45) Date of Patent: May 28, 2024

(54) SAWCUT MACHINE FOR SIDEWALKS

(71) Applicant: N. Piccoli Construction Ltd., London (CA)

(72) Inventor: Mario Piccoli, London (CA)

(73) Assignee: N. Piccoli Construction Ltd., Ontario (CA)

( * ) Notice: Subject to any disclaimer, the term of this patent is extended or adjusted under 35 U.S.C. 154(b) by 1000 days.

(21) Appl. No.: 16/517,954

(22) Filed: Jul. 22, 2019

(65) Prior Publication Data

US 2021/0023740 A1 Jan. 28, 2021

(51) Int. Cl.
*B28D 1/04* (2006.01)
*B28D 7/00* (2006.01)
*B28D 7/02* (2006.01)
*E01C 23/09* (2006.01)

(52) U.S. Cl.
CPC ............. *B28D 1/045* (2013.01); *B28D 7/005* (2013.01); *B28D 7/02* (2013.01); *E01C 23/0933* (2013.01)

(58) Field of Classification Search
CPC .......... B28D 1/045; B28D 7/005; B28D 7/02; E01C 23/0933; E01C 2301/50
USPC ....................................................... 125/13.01
See application file for complete search history.

(56) References Cited

U.S. PATENT DOCUMENTS 5,215,071 A * 6/1993 Mertes .................. B28D 7/005 299/39.1
6,131,557 A * 10/2000 Watson .................. B28D 1/043 125/38
6,484,711 B2 11/2002 Acker et al.
7,451,757 B2 11/2008 Ketterhagen et al.
7,721,825 B2 * 5/2010 Gobright, IV ......... B28D 1/045 175/203
8,733,845 B2 5/2014 Bollinger
9,010,310 B2 4/2015 Bockes et al.
9,039,098 B2 5/2015 Fanslow (Continued)

FOREIGN PATENT DOCUMENTS

CN 108115848 A 6/2018
WO 2015041634 A2 3/2015

OTHER PUBLICATIONS

"Skid Steer Saw" https://www.skidsteersaw.com/ (Accessed Mar. 13, 2019).

(Continued)

*Primary Examiner* — Eric J Rosen
*Assistant Examiner* — J Stephen Taylor
(74) *Attorney, Agent, or Firm* — Thomas | Horstemeyer, LLP

(57) ABSTRACT

Disclosed is a machine for forming saw cuts into sidewalk concrete slabs, the machine comprising a frame, rubber tracks attached to the underside of the frame to self-propel the machine in a travel direction along a sidewalk during use, and a cutting assembly mounted to the frame. The cutting assembly comprises a saw for forming saw cuts, a linear actuator for moving the saw at a depth into the sidewalk, and a screw drive motor to move the saw to form the saw cut in a direction perpendicular to the travel direction. While road repair machinery has the luxury of more space, machines for sidewalks are smaller and tighter. The machine in accordance with the teachings of this invention uses a newly designed cutting assembly to keep the size of the machine useable for sawcuts in sidewalks.

7 Claims, 16 Drawing Sheets

(56) References Cited

U.S. PATENT DOCUMENTS

| | | | | |
|---|---|---|---|---|
| 9,127,418 | B2 | 9/2015 | Bockes et al. | |
| 9,259,849 | B2 | 2/2016 | Hilsgen et al. | |
| 2006/0219079 | A1 | 10/2006 | Zhang | |
| 2007/0163565 | A1 | 7/2007 | Meister | |
| 2011/0155114 | A1* | 6/2011 | Bockes | B28D 1/045 125/12 |
| 2012/0200140 | A1* | 8/2012 | Nagasawa | B28D 7/02 299/39.3 |
| 2014/0028077 | A1* | 1/2014 | Perkins, Jr. | E01C 23/0933 299/10 |
| 2014/0048635 | A1* | 2/2014 | Cutler | E02F 5/30 55/385.7 |
| 2016/0376767 | A1 | 12/2016 | Miller | |
| 2018/0178297 | A1 | 6/2018 | Hephner et al. | |
| 2018/0347124 | A1* | 12/2018 | Lorenz | E01C 23/088 |

OTHER PUBLICATIONS

“Aquajet Systems AB-Rotolance” https://www.aquajet.se/products/rotolance/ (Accessed Mar. 18, 2019).

* cited by examiner

SAWCUT MACHINE FOR SIDEWALKS

FIELD

The present invention relates to a sawcut machine designed to saw cut sidewalk concrete slabs.

BACKGROUND

Traditionally, after sidewalks are formed, a center edger finishing tool is used to put in contraction joints in the sidewalk perpendicular to the side. This tooled joint is applied when the concrete is still wet or workable, therefore making it easy to install.

Many communities have discovered that these tooled joints result in drops in the sidewalks that wheelchair tires can fall into, creating an uncomfortable "bump" as a rider travels along. With an increased desire to make communities more accessible, these tooled joints have been replaced by sawcuts because sawcuts provide a smoother surface for wheelchairs to ride on. Since a sawcut must be formed the next day when the concrete has setup, sawcuts are more difficult to form than traditional tooled joints. To sawcut each joint requires a laborer to be bent over holding a 10 kg saw for about a minute while he preforms the cut at 1.50 m intervals down the sidewalk. That means one man for a full day of cutting to do what the crew poured the previous day. Also, there are is a requirement to capture the dust generated by the saw. This requires a vacuum system or water to suppress the dust. This also requires another laborer to handle the vacuum or water.

U.S. Pat. No. 9,259,849 is directed to a slab cutter particularly for use with road repair. The relative size difference between road repair and sidewalk formation makes this equipment ineffective for use to form sawcuts in sidewalks. The road saw of U.S. '849 is a large piece of equipment that is required to straddle the road because it would be to heavy to travel in a newly paved concrete for fear of breaking the concrete. Further, the metal track would do considerable damage to the concrete surface. The straddling of the sidewalk would not be permissible due to obstructions (ie, hydro pole, hydrants, trees, bushes, etc.) that are usually in the way. Also, special ground grading would have to be done on either side of the sidewalk in order to accommodate a straddling machine's tracks. This work would be not required to be done otherwise so there would be an added expense for this.

DESCRIPTION OF PREFERRED EMBODIMENTS

Figure 1:
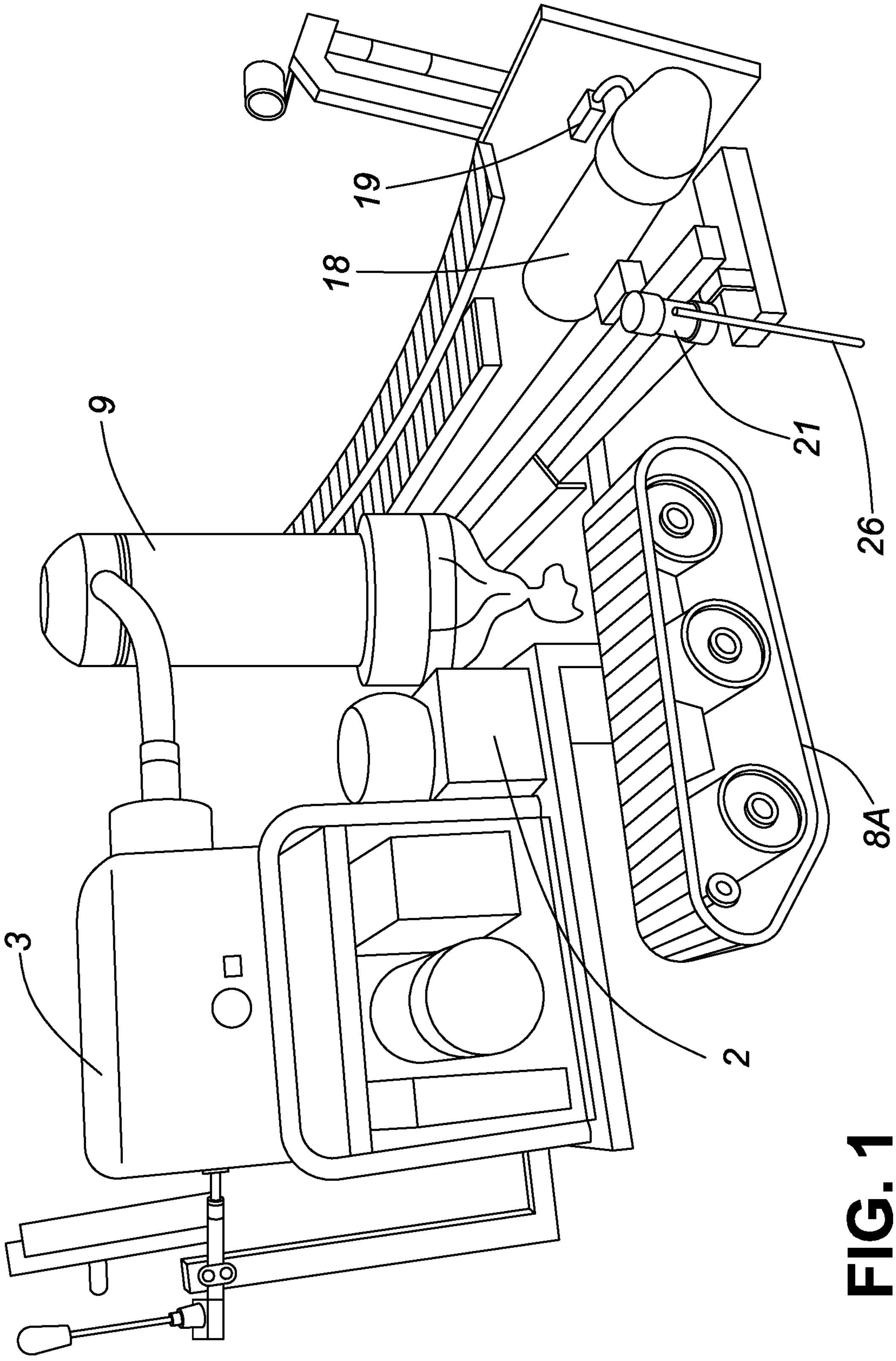
FIG. 1 illustrates a sawcut machine designed to saw cut sidewalk concrete slabs in accordance with the teachings of this disclosure.
Figure 2:
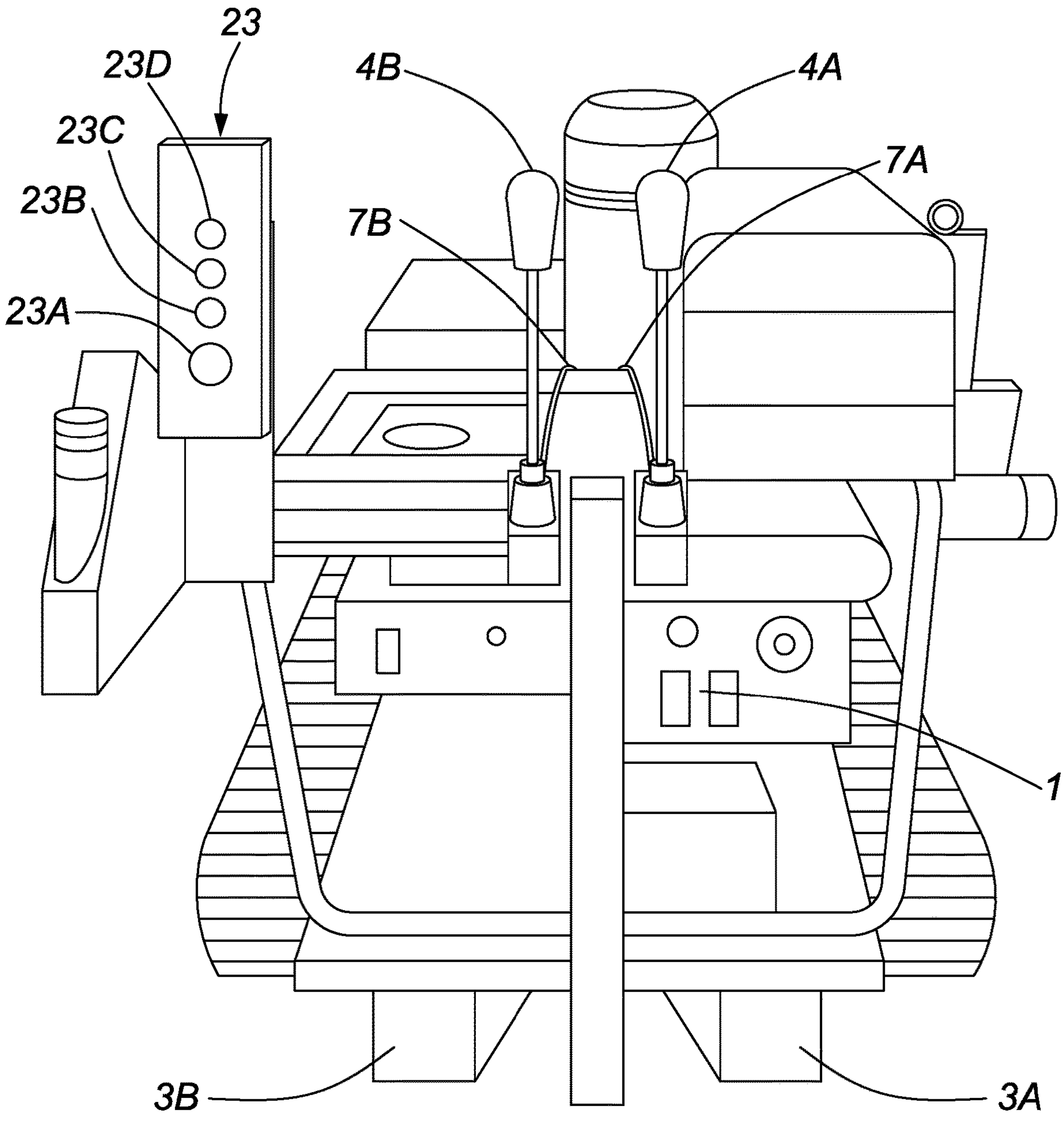
FIG. 2 illustrates details of the user end of the machine of FIG. 1.
Figure 3A:
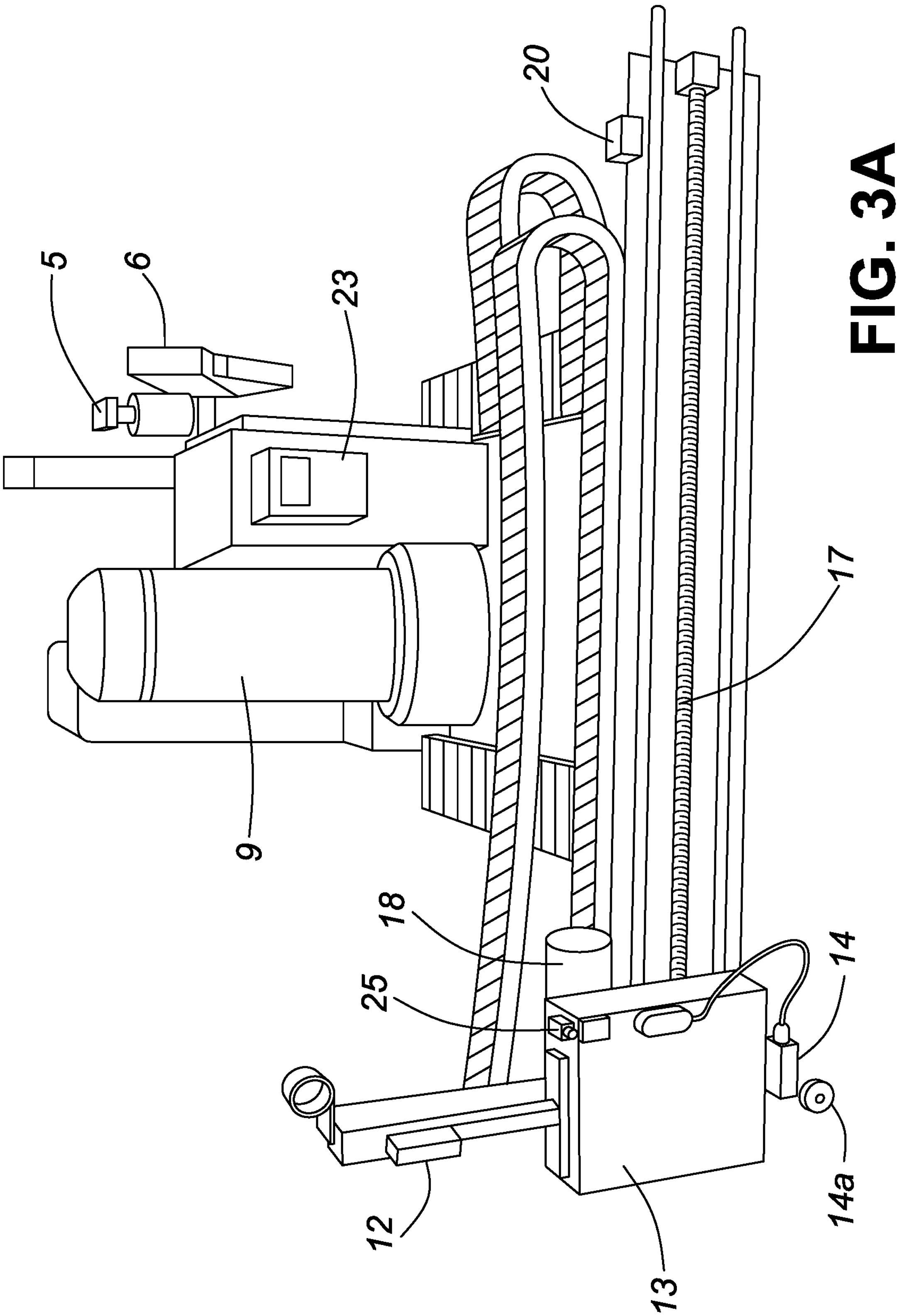
FIGS. 3*a*, 3*b*, 3*c* and 3*d* illustrate details of the cutting end of the machine of FIG. 1.
Figure 3B:
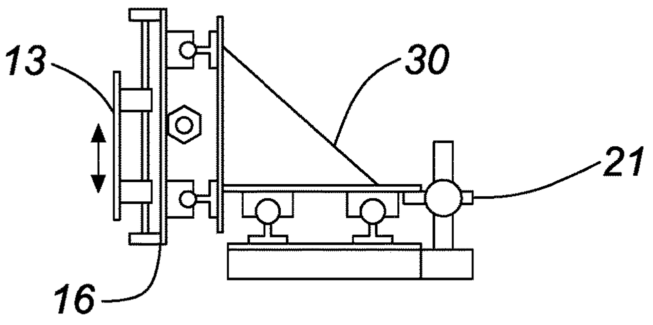
Figure 3C:
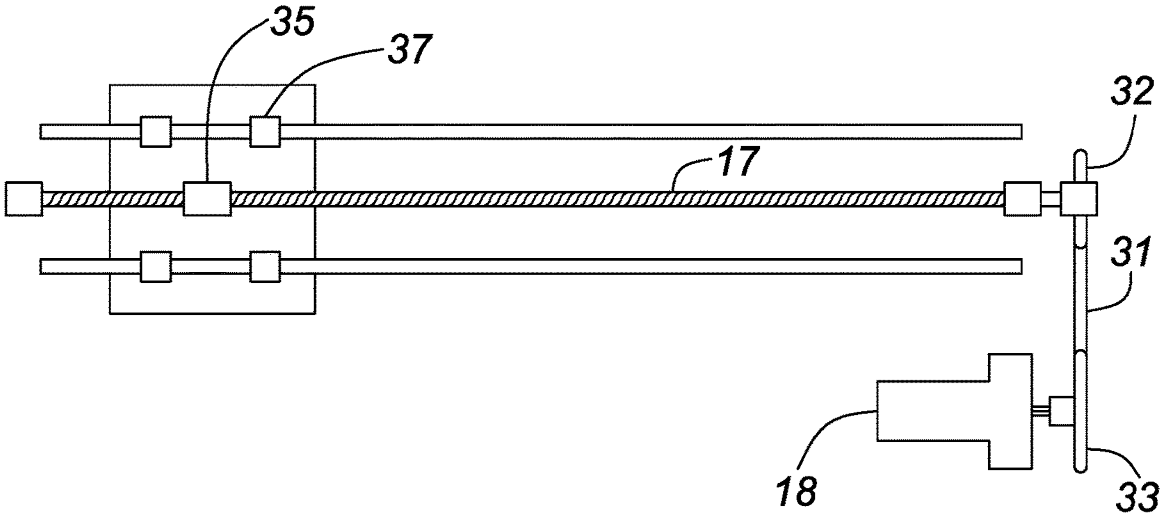
Figure 3D:
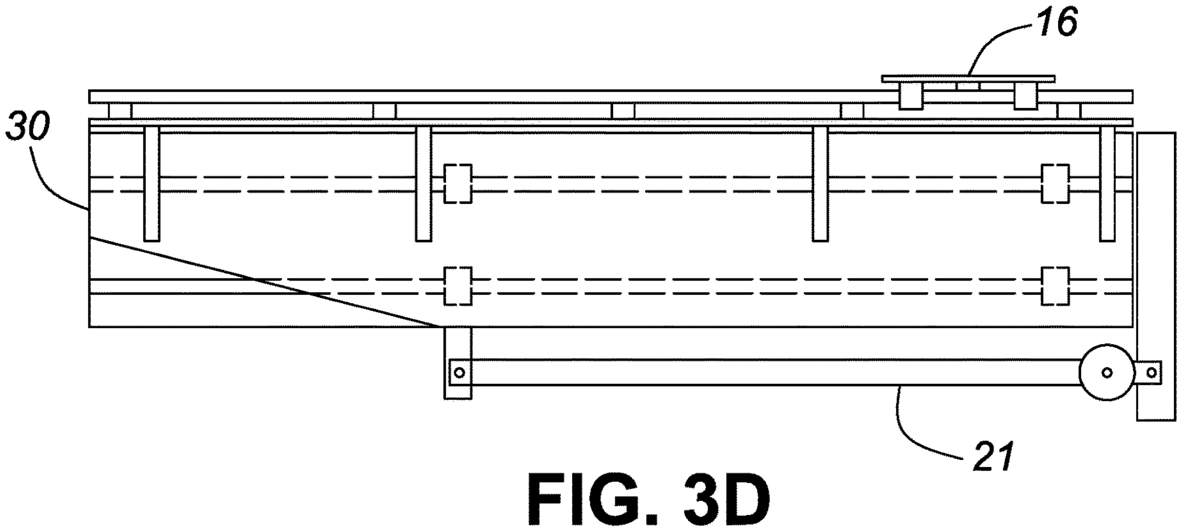
Figure 4:
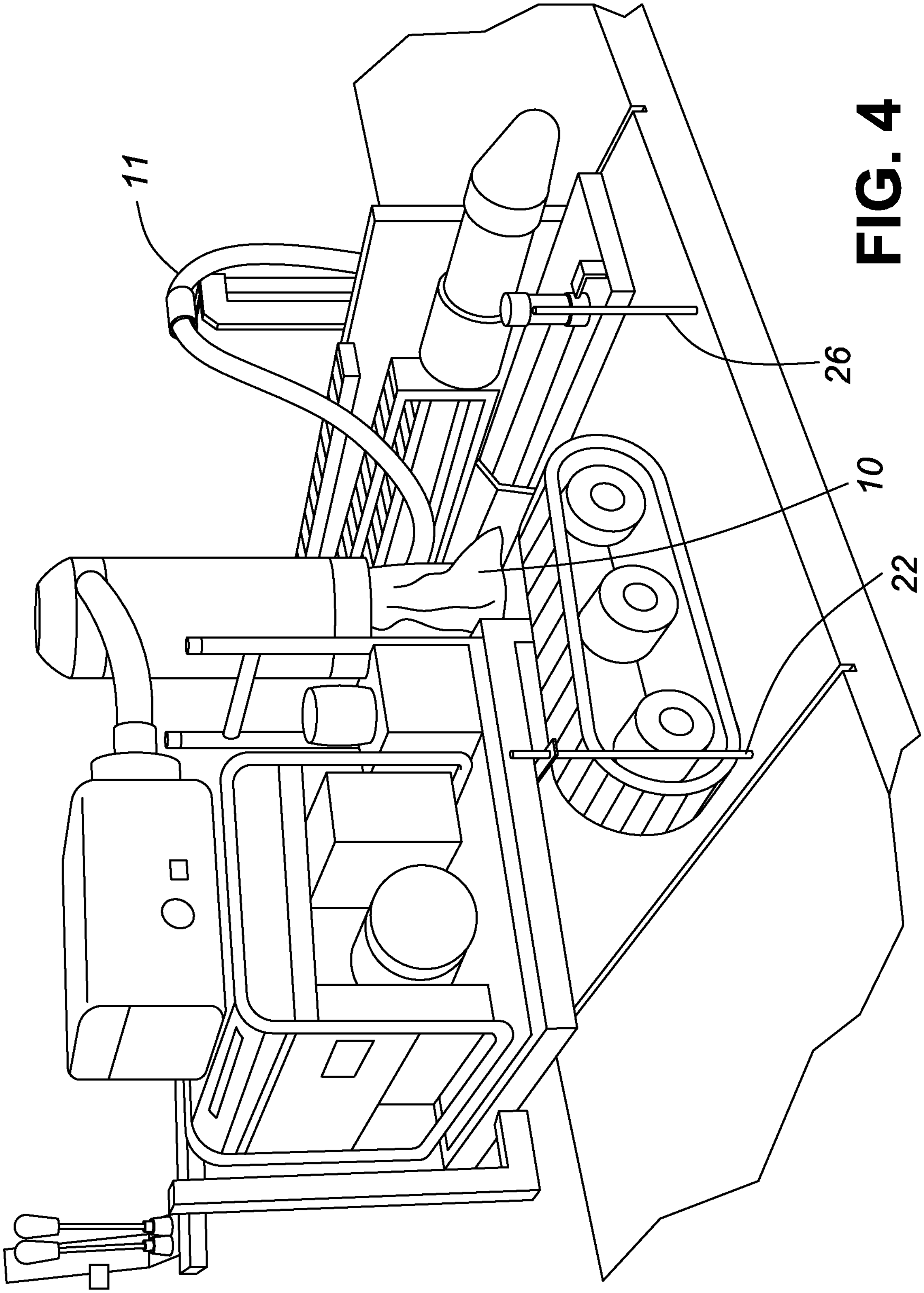
FIG. 4 illustrates the position of an adjustable pointer on the machine of FIG. 1.
Figure 5:
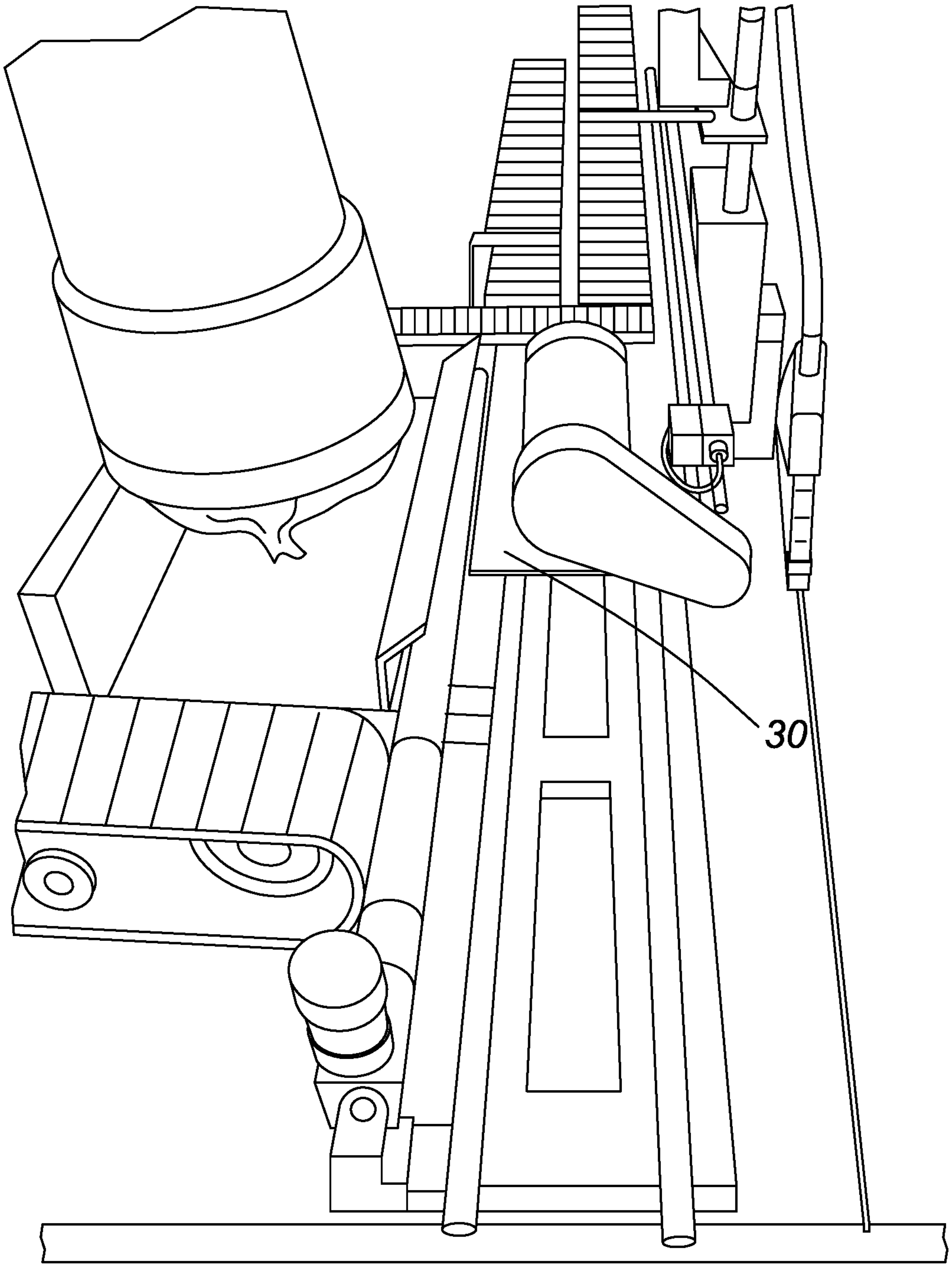
FIG. 5 illustrates details of the carriage of the machine of FIG. 1 where the main frame carriage is shifted to its limit.

FIGS. 1 to 5 illustrate various views of a sawcut machine designed to saw cut sidewalk concrete slabs in accordance with the teachings of this invention. The frame of the machine can move in the direction of the sidewalk pavement and can make cuts perpendicular to its travel direction. The sidewalk cutter in accordance with the teachings of this invention is light weight so it can travel on newly poured concrete (24 hrs old) without fear of breaking the sidewalk and the rubber tracks prevent any damage to the concrete surface. Further, additional ground grading work would not be required with the sidewalk cutter because it travels on the sidewalk. Also, the rubber tracks make it easier to climb onto the sidewalk from uneven ground whereas wheels would get stuck.

The contemplated sidewalk cutter consists of many components. The generator 1 provides electrical power for the entire machine. Preferably the generator is a 9000-watt generator. There is an electrical motor 2 that drives (via a fan belt, pulleys and an electric clutch—not shown) to two self-contained hydrostatic drives 3A & 3B. Preferably the motor is 3 hp.

The machine is intended to be self propelled by tracks 8*a* and 8*b*. The travel motor drives two conventional drives for each track and can be controlled via levers for each track similar to a skid steer. There is preferably one drive for each track. The hydrostatic drives have an intergraded hydraulic pump and motor. The 3 hp motor drives the pump and the direction lever 4A & 4B (via a control cable 7A & 7B) controls the pump's output oil flow. When the control lever is in a neutral position, there is no output flow from the pump. If the lever is in the forward position, the pump will flow oil to a motor which in turn will turn the track 8A or 8B. The degree of forward motion on the lever is directly proportional the speed the motor and or track. Moving the level in the opposite direction will the same affect as above only in the opposite direction.

The vacuum 3 is electric with a cyclone separator 9. This cyclone will separate a bulk of the heavy dust into a disposable plastic bag 10 and the fine dust is filtered using a pleated paper element filter (contained inside the cyclone). The electric saw motor 5 has an attached dust guard 6 to direct the dust to the vacuum hose 11. The opposite end of the vacuum hose is connected to the inlet of the cyclone 9. This machine will sawcut the joint and vacuum the dust automatically without the need for the laborer to carry the saw or handle the vacuum. It is a back saving and laborer cost saving machine.

As mentioned, size is a key advantage of this machine. While road repair machinery has the luxury of more space, machines for sidewalks are smaller and tighter. The machine uses a newly designed cutting assembly to keep the size of the machine useable for sawcuts in sidewalks. In a preferred embodiment, the cutting assembly comprises a screw drive system in combination with a linear actuator which can extend the saw cutting distance and keep the width of the machine to a minimum.

Figure 8A:
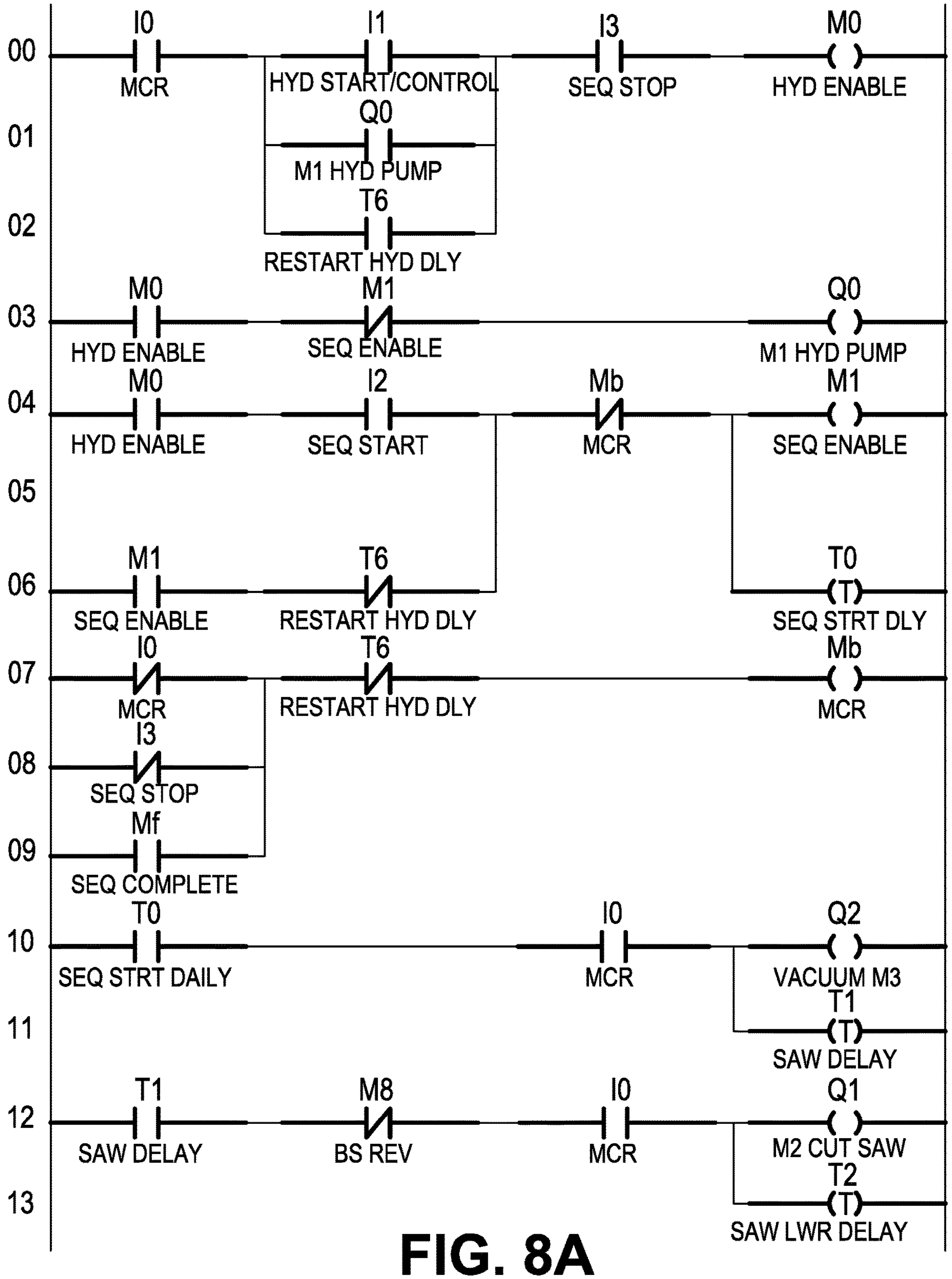
FIGS. 8*a*, 8*b* and 8*c* are schematics of a possible embodiment of saw wiring and PLC programming used on the machine of FIG. 1.
Figure 8B:
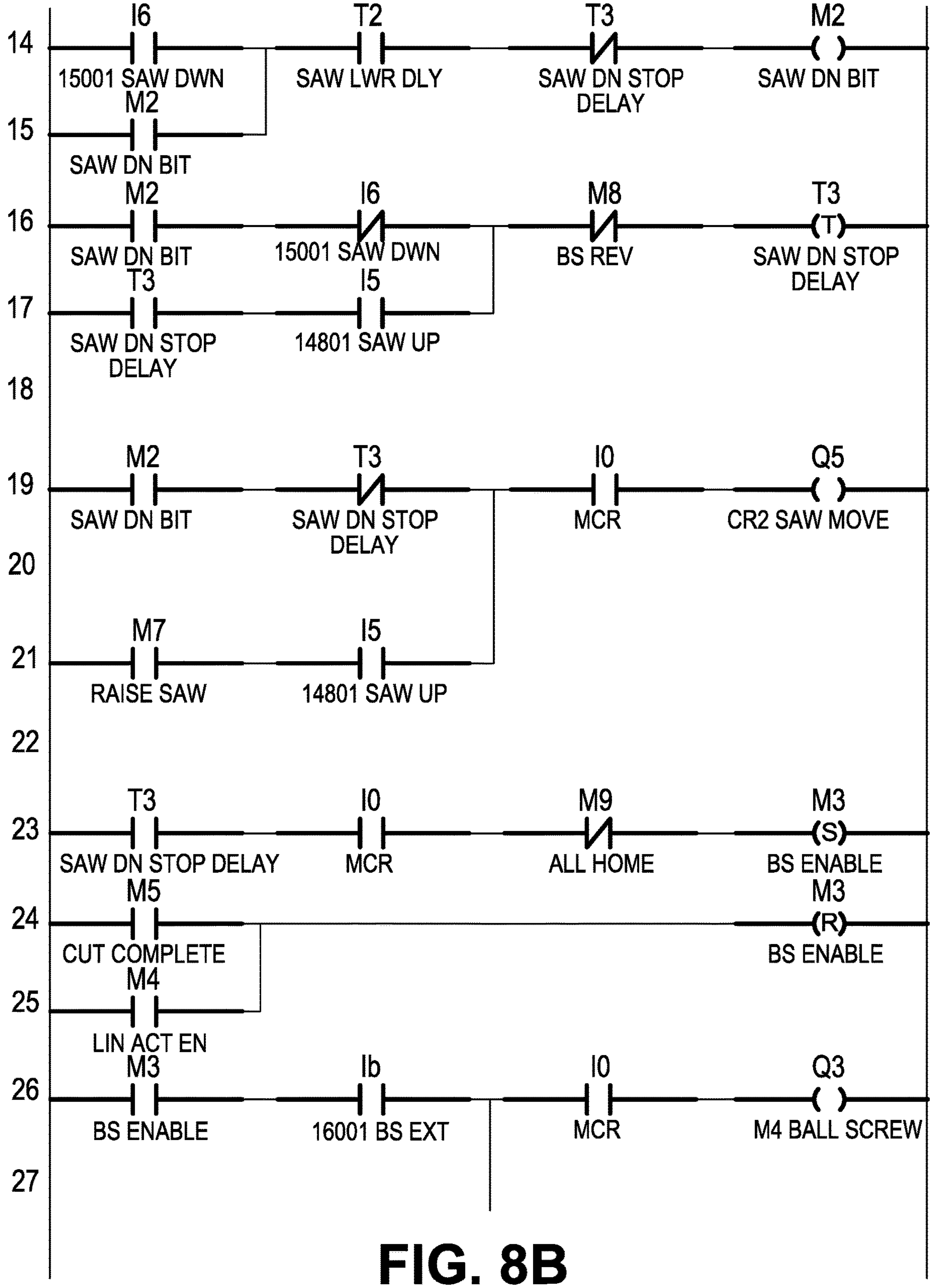
Figure 8C:
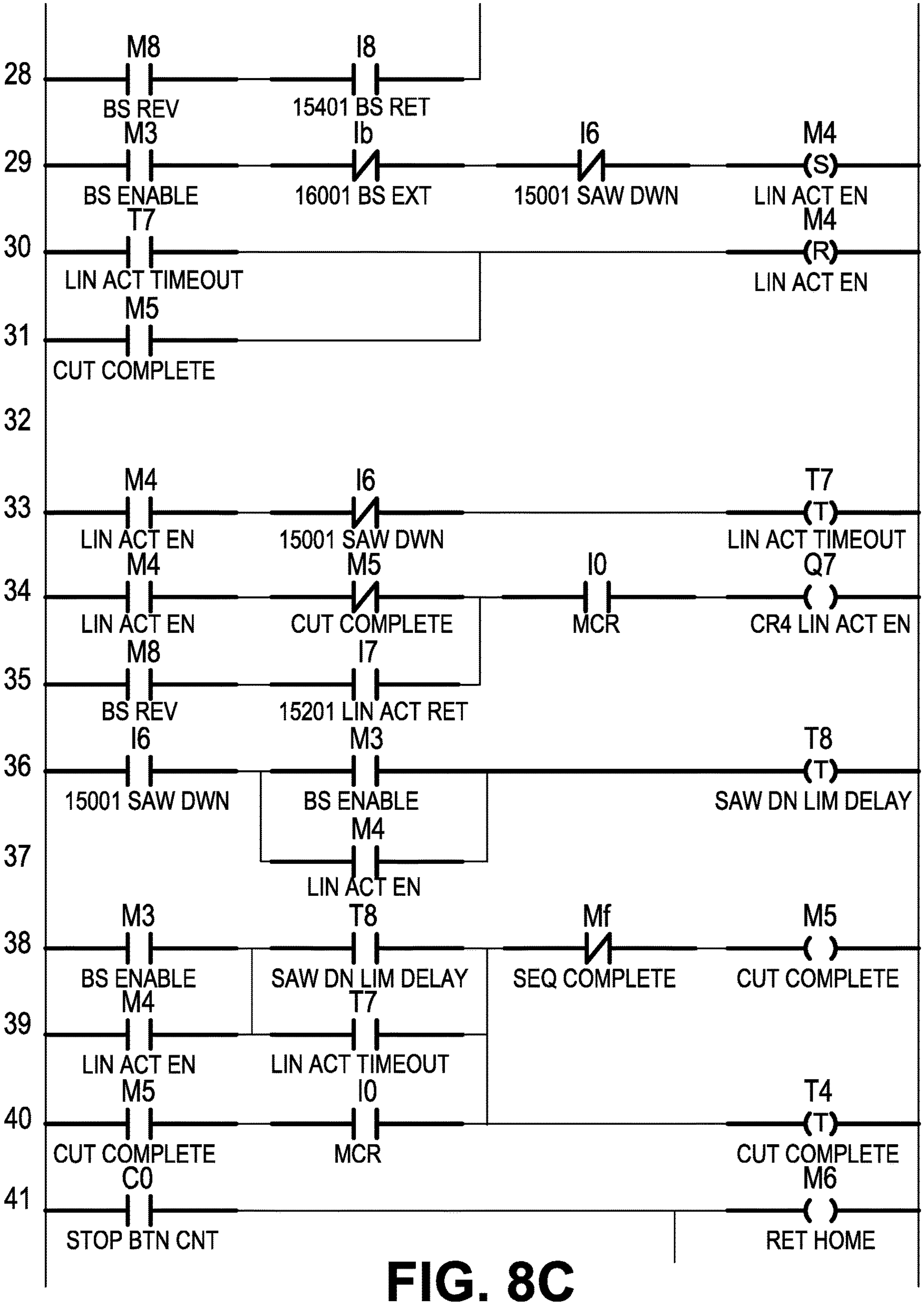

The raising and lowering motion of the saw motor 5 is enabled by a linear actuator 12. The saw smoothly travels on a carriage 13 that consists of two rails and four linear bearings and mounting plates. This assembly can be seen in FIGS. 3*a* and 3*b*, while FIGS. 8*a* 8*b*, 8*c* illustrate the wiring schematic. It will be understood that this wiring is one of many possible embodiments, all of which would fall within the scope of the present invention.

The cutting is automatically actuated using controllers. Sensors can detect the depth and the length of the cut necessary. The cutting length can be adjusted from 0.0 m to 2.5 m and the speed can also be controlled using a VFD as described below. The system can be programmed to repeat cuts at a specific depth and length.

Figure 6:
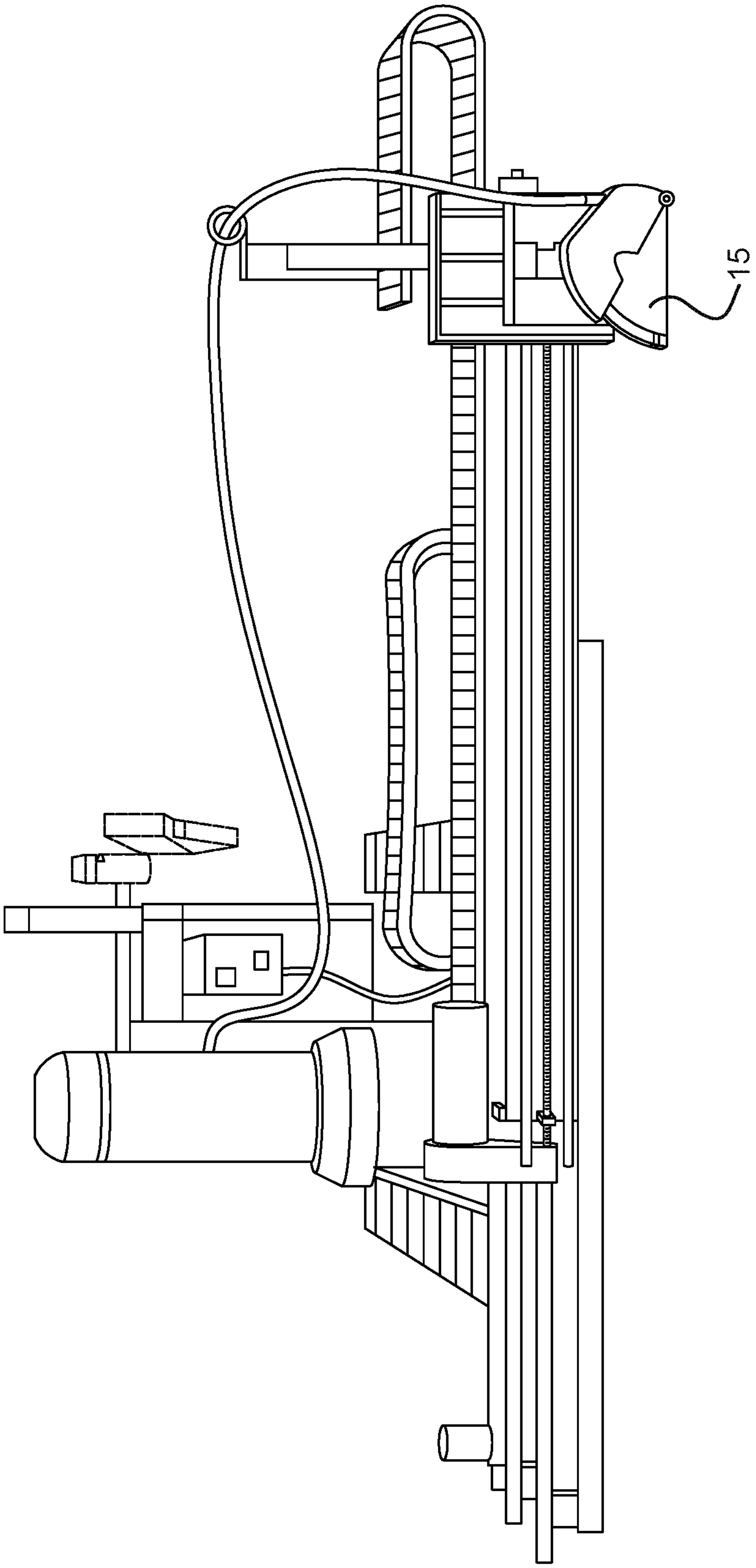
FIG. 6 is a front view of FIG. 5.
Figure 7A:
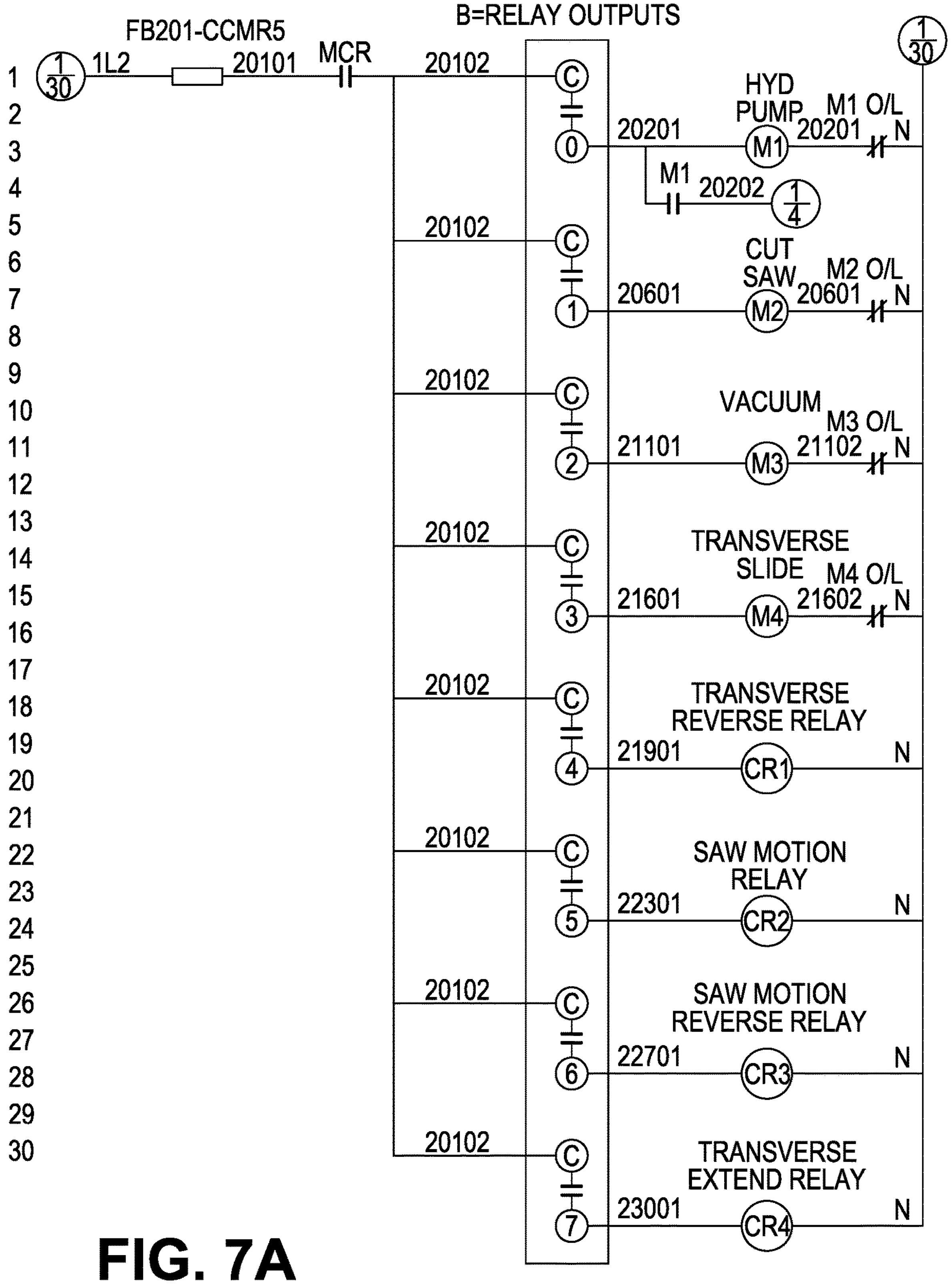
FIGS. 7*a* and 7*b* are schematics of a possible embodiment of the programmable logic controller (PLC) used by the machine of FIG. 1.
Figure 7A:
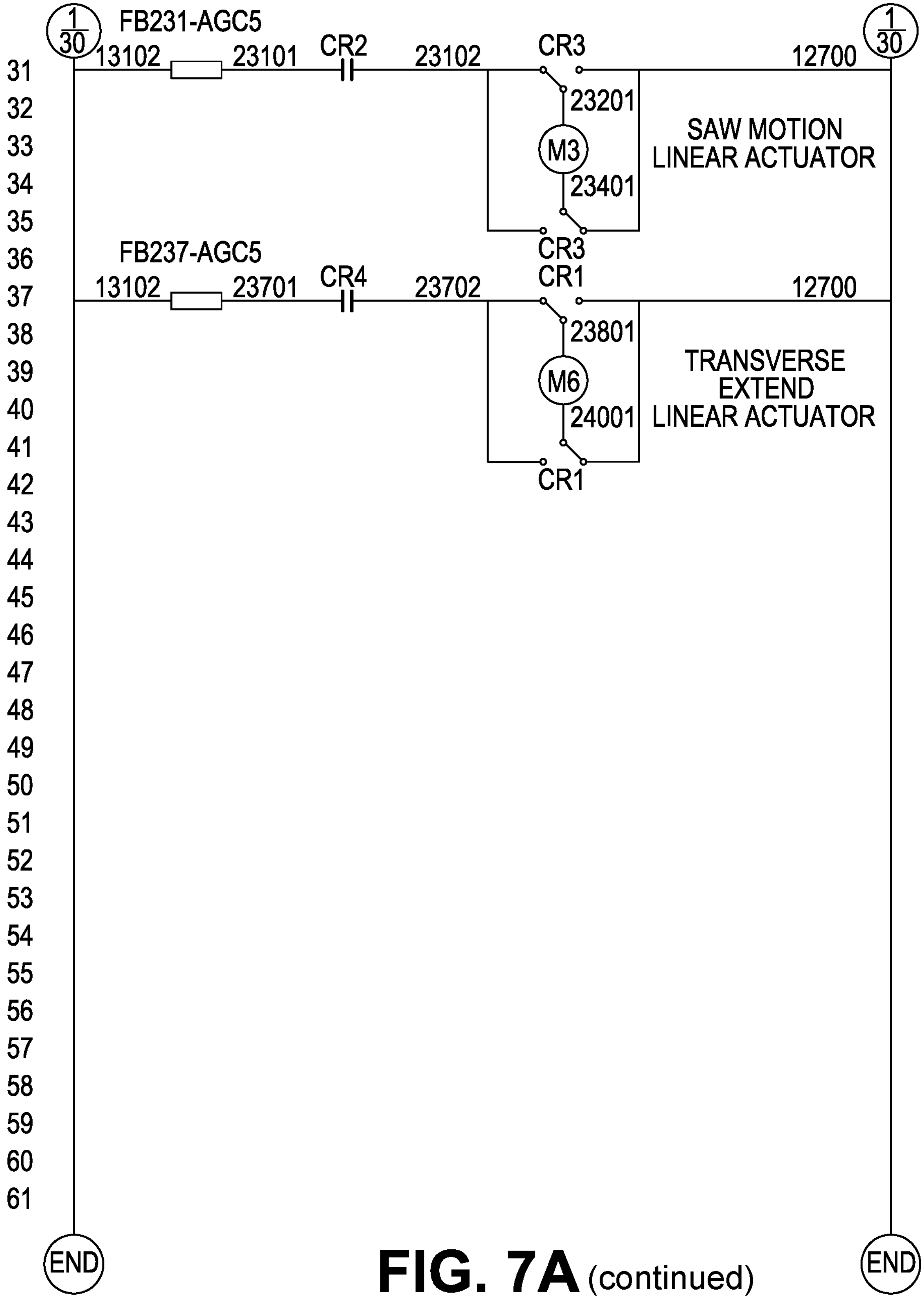
Figure 7B:
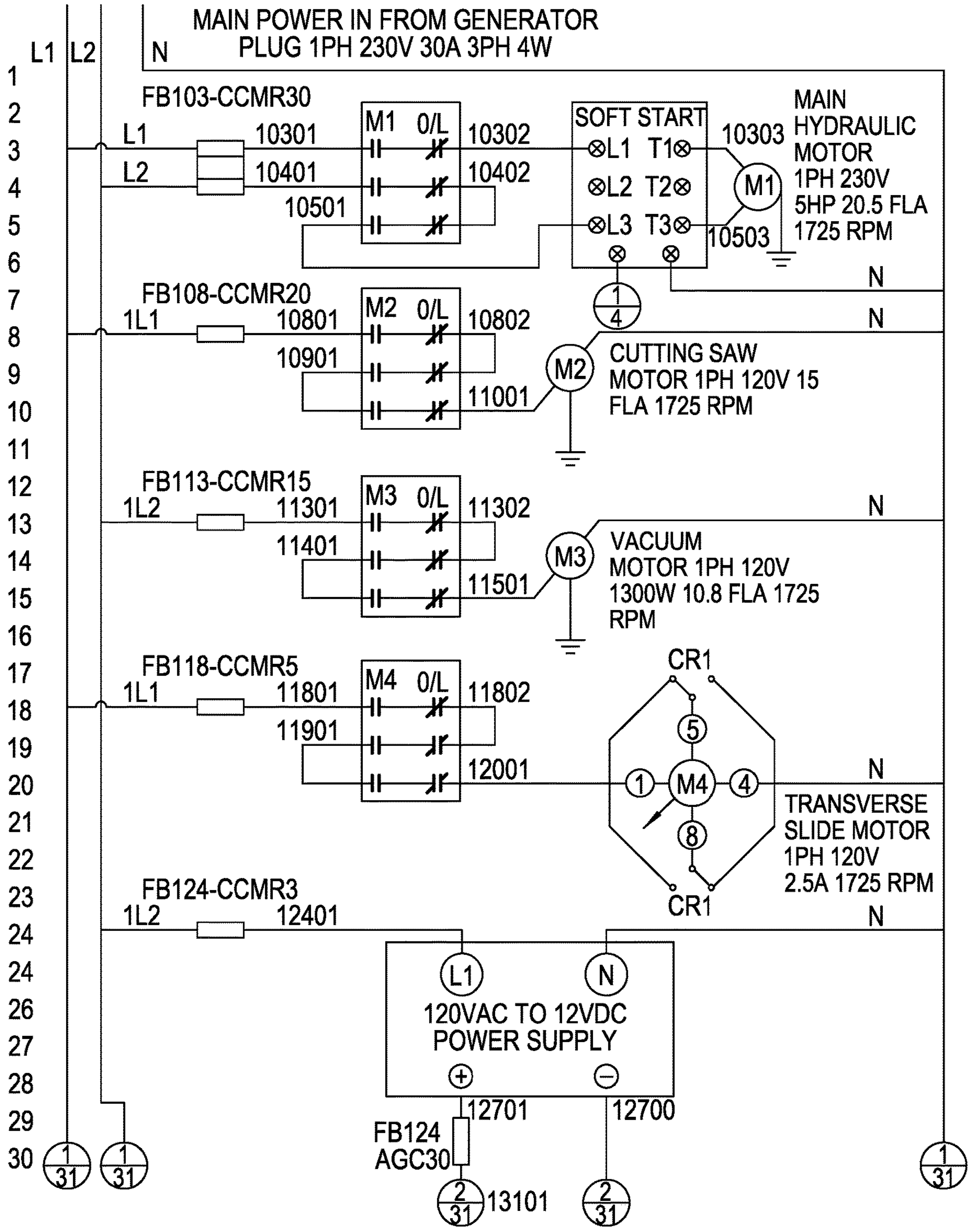
Figure 7B:
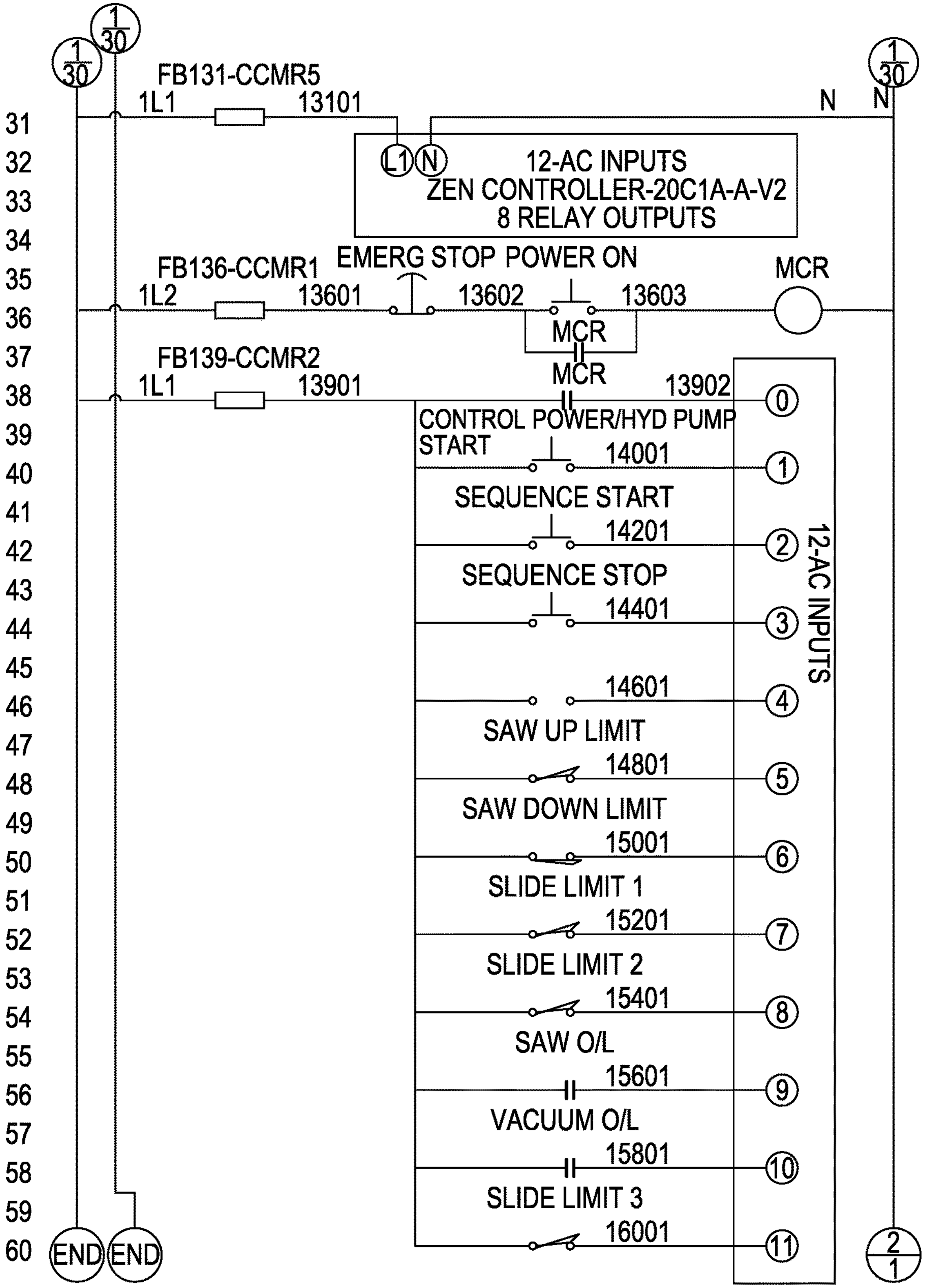

First the linear actuator 12 moves the saw down into the concrete. The depth of the saw blade 15 is controlled by a positon switch 14. FIG. 6 is a schematic of the PLC (programmable logic controller) program that controls the depth control assembly. The PLC controls all the electric components on this machine. It controls these components to make the entire sawcut automated. All the sequencing of motors and actuators is handled by the PLC. Allowing the PLC to control these components to make the sawcut increases efficiency speed and decreases the likelihood of damage cause by operator mistake.

The wheel 14A on the switch triggers the switch as it contacts the concrete surface. The wheel is designed so that the limit switch is not damaged as the saw moves. By adjusting the position of the switch the depth of the cut can be determined.

Figure 9:
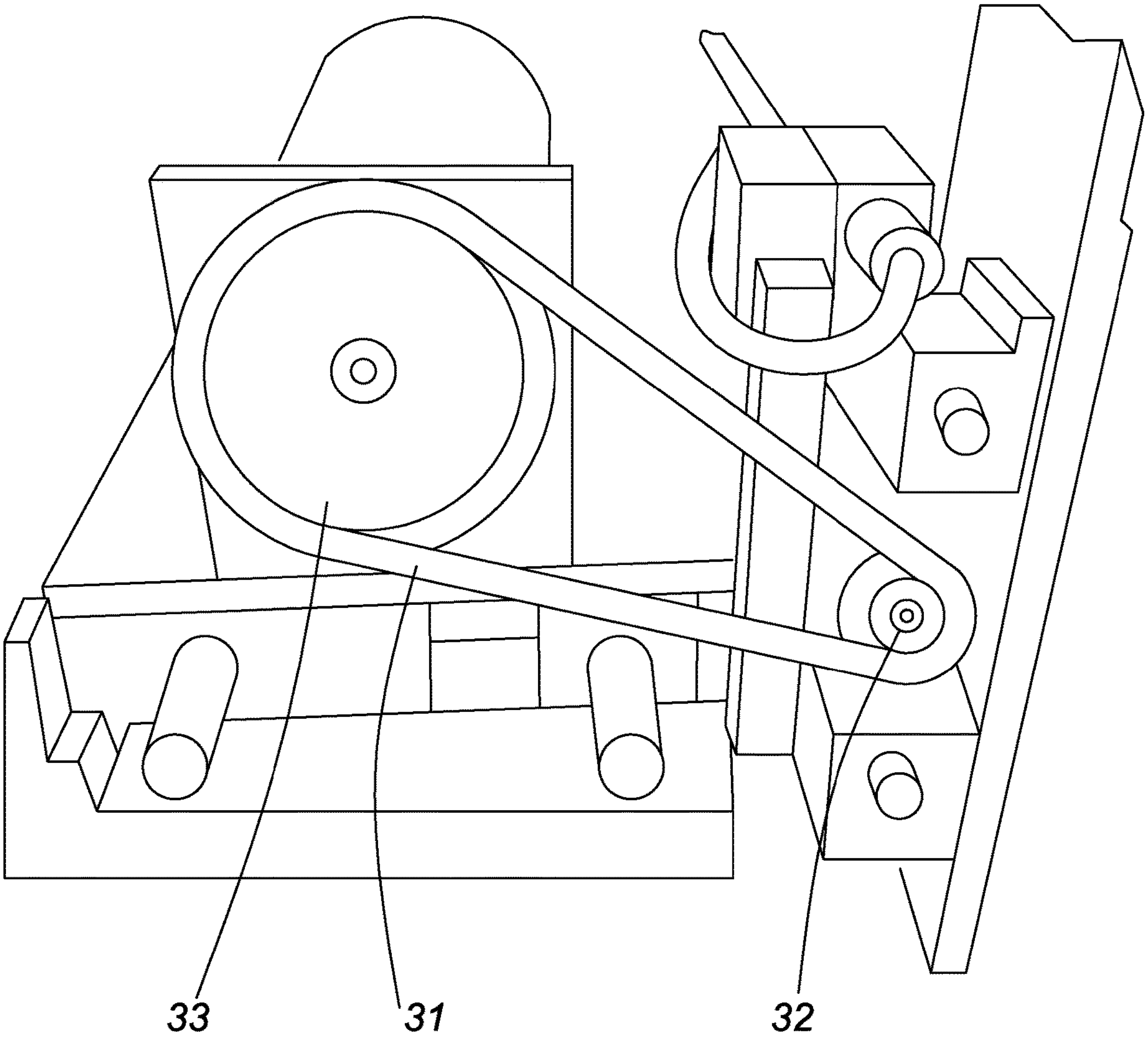
FIGS. 9 and 10 illustrate a chain drive assembly used by the machine of FIG. 1.
Figure 10:
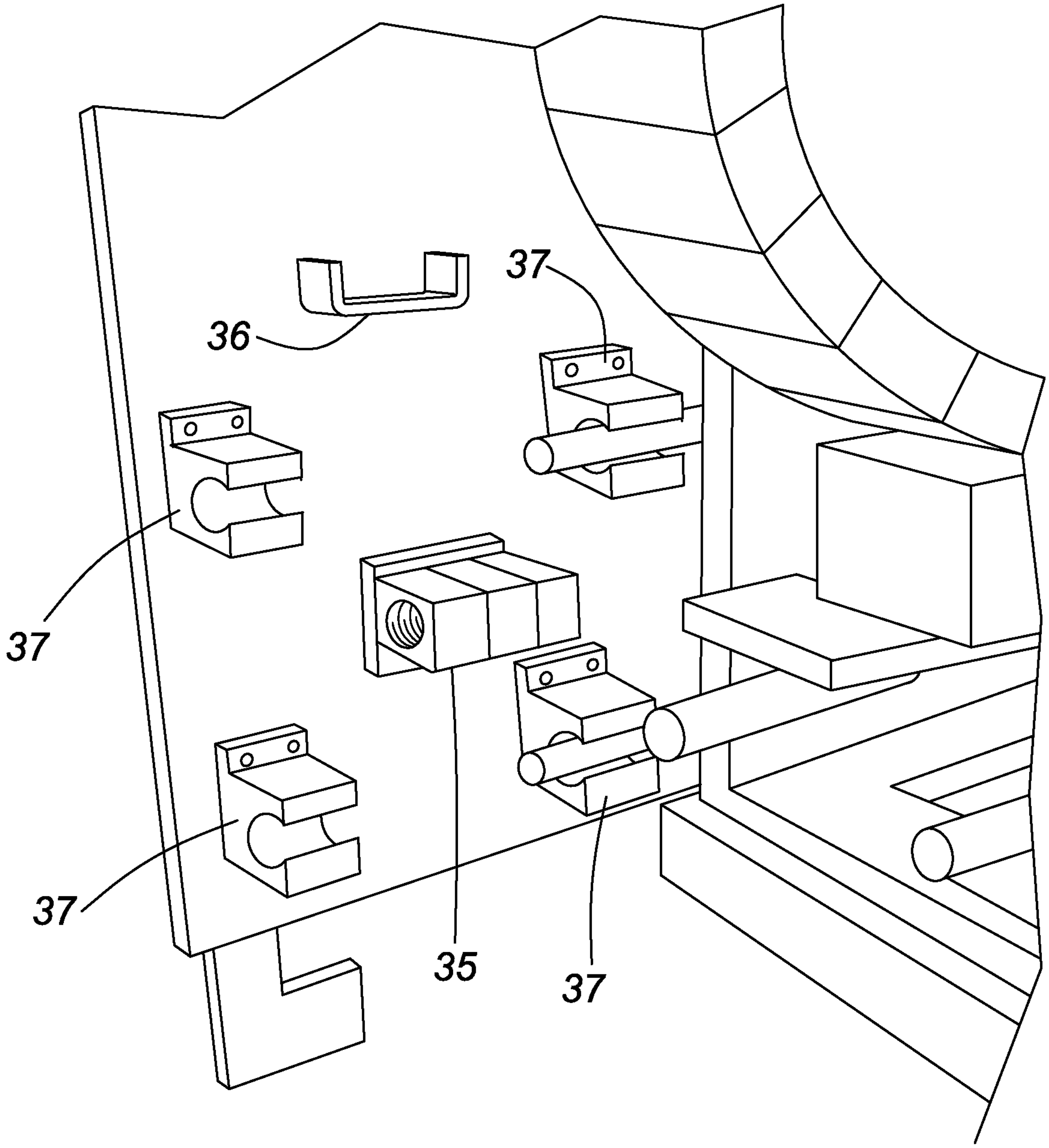

The saw carriage 13 is mounted to another carriage 16 which moves back and forth on another rail system with 2 rails and 4 linear bearings. This carriage moves via a drive screw 17 that is coupled to the screw drive motor 18. A chain drive with two sprockets couple the drive motor to the drive screw. Referring to FIGS. 9 and 10, 33 is the drive sprocket that is connected to the drive motor 18. Sprocket 32 is connected to the drive screw 17 and the two sprockets are coupled together by the chain 31.

The travel limits of the saw are controlled by a travel control assembly, which comprises limit switches 19 & 20. Limit switch 19 stops the saw when returning home and limit switch 20 signals the computer the saw has reached the limit of the rail.

As the saw is cutting and moving across the sidewalk, the limit switch 14 will signal the saw to stop cutting and return home (the saw home position is upper left when facing the front of the machine) when the switch wheel 14A drops off the edge of the sidewalk. If the saw has not reached the edge of the sidewalk and limit switch 20 has been triggered by the saw carriage, then the main frame carriage 30 will begin to move or shift via the actuator 21. The actuator will continue to move the main frame until the limit switch wheel 14A drops off the edge of the sidewalk. If the actuator 21 fully extends and the limit switch wheel has not dropped off the sidewalk (this will happen when the sidewalk is wider then the limits of the saw), then the saw will stop cutting and return to the home position.

The advantage of having the 2 tiered moving frame is that the width of the machine can be minimized with the ability to expand to a much wider width. With a narrow machine width design allows it to travel down a standard sidewalk without exceeding the edges of the sidewalk therefore easily clearing any obstructions at may be close the sidewalk (ie poles, hydrants, guide wires, water valves . . . ) Also, the narrow width gives it the ability to be loaded on a standard enclosed trailer for transport. Any wider, then a custom trailer would have to be manufactured to transport the machine.

Limit switch 25 stops the saw carriage when it reaches the top position.

An adjustable pointer 22 is mounted and the side of the machine and can be adjusted to a predetermined distance for repetitive joint spacing. Simply line up the pointer to the pervious sawcut will eliminate the need to measure the sawcut spacing. The edge of sidewalk pointer 26 is used to line up the machine to the edge of sidewalk. If the sidewalk is adjacent to the curb, this pointer can also be used to lineup the machine to make a cut without cutting into the curb.

The push button controller 23 controls the functions of the saw. There are four buttons on this controller.

1—E-Stop 23A—this is a locking push button switch that will shut down all functions of the machine in an event of an emergency.

2—2—Yellow button 23B—Power on, all machine functions will be activated when pressed after initial startup. This will only be necessary first time the machine is started.

3—3—Green button 23C—sawcut start. This will start the beginning of a sawcut. The sawcut will end automatically and return home when either the limit switch 14 signals the computer or the saw limit is reached.

4—4—Red button 23D—Stop button, this will stop the saw from moving and cutting. Pressing this button 3 times will force the saw to its home position.

The saw motor can be removed from its carriage and stored on a hanger on the side of the machine so that saw and blade are not damaged while maneuvering the machine on a jobsite.

In this preferred embodiment, all systems are electric powered by a gas generator. This keeps the weight down and more suitable for sawcut formation. A hydraulic system would weigh more as the added oil tank, oil cooler, hoses, valves and cylinders to control all the functions would add a considerable amount of weight which then would make it heavy enough that the machine could start to damage the concrete by being to heavy. These added components are very expensive driving the cost of the machine must higher.

FIG. 7 is a schematic of one embodiment of the saw wiring and PLC programming used on the machine of FIG. 1. One skilled in the art will understand that this could be altered and still fall within the scope of the present invention.

As mentioned above, the VFD (variable frequency drive) 24 is used to control the cutting speed of the saw. The VFD controls the speed of drive screw motor 18 which controls the travel speed of the saw. The VFD monitors the amount of current that the saw motor 5 is using (preferably 15 amps max) and will adjust the travel speed of the saw so that it will never draw more then maximum amps. This will allow the saw to run at max travel speed without overloading the saw motor. There are two primary reasons for adjust the speed of the saw. 1—Cutting depth. The deeper the blade is cutting, the slower the saw must travel. More concrete is to be removed when cutting and that requires more time. 2—A worn blade. As the blade begins to wear out, the efficiency begins to decrease so a slower saw travel speed is required.

Prior to the construction of this saw, the sawcuts were perform by two laborers. First the two laborers would mark all the cuts to be made with a chalk line and chalk. A straight line is required for the person cutting the concrete to follow. Depending on the production of the concrete crew, weather by hand or machine, this marking is a time-consuming process. On an average crew daily production, this could amount to a least 150-line marks and cuts to do done. If there is a machine pouring the sidewalk, then this number could double.

Next, one person will do the sawcutting using a portable concrete saw with a concrete cutting blade and the other to either hold a vacuum hose at the saw blade to capture the dust or a water hose and spray water at the saw blade to suppress the dust. The concrete saw weights approximately 10 kg and the person is bent over while doing the cut. Therefore, the weight of the saw puts a large strain on the persons back. Based on a crew daily production, the person saw cutting would be bent over for approximately 4 hrs cutting the concrete.

Also, if water is used instead of a vacuum, then there is added time to clean the concrete slurry off the sidewalk using a pressure washer and water.

After building the saw, there is only one laborer to do the cuts. There is no need to mark the sidewalk because of the built in adjustable joint spacing gauge/pointer 22 and the vacuum dust collection means that there is no slurry cleanup and the laborer is not bent over most of the day doing the cuts. Also, due to the construction of the saw, it produces perfectly straight cuts so no need to mark lines to follow to get a straight cut.

The machine in accordance with these teachings is very simple to operate making training for someone new operating the saw very easy. A sawcut is performed by moving the machine until the joint spacing pointer 22 is lined up with the previous cut and then press the start button. The saw will perform the entire sawcut automatically. Then the person moves the machine forward until the joint spacing pointer lines up with the just made and presses start again to perform the next sawcut.

Operating Procedure

Start the generator 1.

Make sure the e-stop button 23A is not engaged and then press power button (yellow 23B)

The drive motor 2 will start and after a few seconds an electric clutch will engage and the machine is able to move via control levers 4A & 4B Move the machine to its starting position where the first cut is to be made. Install the saw on the front of the machine and hookup the electrical and the vacuum hose 11.

Set the Joint pointer 22 to the proper joint spacing.

Confirm that the machine is in the correct starting position. If so, then press the start button (green 23C)

At this moment, the drive motor 2 will turn off. This will prevent the machine from moving during a cut to eliminate to possibility of damaging the blade. The vacuum 3 will now turn on and so will the saw motor 5. The saw motor 5 begins to go down the blade 15 cuts into the concrete until the limit switch 14 signals the PLC to stop the actuator 12. The actuator 12 stops and the screw drive motor 18 turns on and that begins to move the saw to make the cut. The sawcut will continue until the limit switch wheel 14A drops off the edge of the sidewalk. This may involve limit switch 20 and main frame actuator 21 if the sidewalk walk is extra wide. Once the wheel 14A drops off the sidewalk, the vacuum 3 and saw motor 5 both shut off and the saw begins to rise via actuator 12. Once the saw carriage reaches limit switch 25, then the saw will begin to return home and the drive motor 2 starts and after a few seconds, the electric clutch engages and starts the hydrostatic drives so the machine can be moved to the next cut location as the saw returns home. Once the saw carriage reaches home limit switch 19, then the saw is home and at this time the next cut can start.

move the machine to the next cut and stop when the joint pointer is over the previous cut and the edge of sidewalk pointer is on the edge of the sidewalk.

press start button (green 23C) to start the next sawcut and repeat the process.

The invention claimed is:

1. A machine for forming saw cuts into concrete slabs of a sidewalk, the machine comprising:
- a frame;
- rubber tracks attached to the underside of the frame, the rubber tracks configured to travel over the sidewalk;
- a track drive motor configured to drive the rubber tracks to propel the machine in a travel direction along the sidewalk during use;
- a cutting assembly mounted to the frame, the cutting assembly comprising:
  - a saw for forming saw cuts;
  - a linear actuator for moving the saw at a depth into the sidewalk; and
  - a saw drive motor to move the saw to form the saw cut in a direction perpendicular to the travel direction;
  - a travel control assembly for controlling the travel of the saw while the saw is forming the saw cut, wherein the travel control assembly comprises a limit switch configured to signal the saw to stop forming the saw cut, and wherein the limit switch includes a switch wheel and the limit switch signals the saw to stop forming the cut when the switch wheel drops off the edge of the sidewalk; and
- a gas generator coupled to the frame, the gas generator configured to provide electric power to at least one of the track drive motor and the saw drive motor, and the cutting assembly.

2. The machine of claim 1, wherein the saw drive motor is a screw drive motor connected to a drive screw such that they turn in unison.

3. The machine of claim 1, further comprising a depth control assembly using a programmable logic controller (PLC) for controlling the linear actuator.

4. The machine of claim 1, further comprising a vacuum with a cyclone separator to collect dust created by the saw cut formation.

5. The machine of claim 4, wherein the vacuum is electric.

6. The machine of claim 4, wherein the saw includes a dust guard to collect dust into the vacuum.

7. The machine of claim 1, wherein the track drive motor is turned off when the saw drive motor is turned on to reduce likelihood of damage to the saw.

* * * * *